US012791724B2

(12) United States Patent
Kim

(10) Patent No.: US 12,791,724 B2
(45) Date of Patent: Nov. 10, 2026

(54) LiDAR SENSOR FOR MEASURING NEAR-REFLECTIVITY, OPERATING METHOD THEREOF, AND VEHICLE INCLUDING LiDAR SENSOR

(71) Applicant: HL KLEMOVE CORP., Incheon (KR)

(72) Inventor: Daegyeong Kim, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 1107 days.

(21) Appl. No.: 17/899,619

(22) Filed: Aug. 31, 2022

(65) Prior Publication Data

US 2023/0136042 A1 May 4, 2023

(30) Foreign Application Priority Data

Oct. 28, 2021 (KR) ........................ 10-2021-0145649

(51) Int. Cl.
*G01S 17/931* (2020.01)
*G01S 7/497* (2006.01)

(52) U.S. Cl.
CPC ............ *G01S 17/931* (2020.01); *G01S 7/497* (2013.01)

(58) Field of Classification Search
CPC ........ G01S 17/931; G01S 7/497; G01S 7/484; G01S 7/4861; G01S 7/481; G01S 17/18
See application file for complete search history.

(56) References Cited

U.S. PATENT DOCUMENTS 5,249,046 A * 9/1993 Ulich ...................... G01S 17/89 348/81
7,643,135 B1 * 1/2010 Walsh ................... G01S 17/931 356/140
10,752,158 B2 * 8/2020 Satat .................... B60Q 1/0023
(Continued)

FOREIGN PATENT DOCUMENTS

KR 10-2019-0049871 5/2019
KR 20190049871 A * 5/2019 ............. G01S 17/04

OTHER PUBLICATIONS

Office Action dated Mar. 5, 2025 for Korean Patent Application No. 10-2021-0145649 and its English translation by Google Translate.

*Primary Examiner* — Isam A Alsomiri
*Assistant Examiner* — Benjamin Wade Clouser
(74) *Attorney, Agent, or Firm* — WOMBLE BOND DICKINSON (US) LLP

(57) ABSTRACT

Provided are a light wave detection and ranging (LiDAR) sensor, an operating method thereof, and a vehicle including the LiDAR sensor. The LiDAR sensor is configured to detect surroundings of a vehicle, and includes a transmitter configured to generate light and transmit the light to an object, a receiver configured to receive light reflected from the object, and a signal processor configured to detect the object by processing a signal of the light received by the receiver, wherein the object is detectable both at a long distance and a short distance, and when the object is detected at the short distance, the transmitter outputs light while gradually reducing an intensity of the light, compared to when the object is (Continued)

detected at the long distance, and the signal processor determines reflectivity for a cell included in a sensor on the basis of an activation maintenance time or an activation frequency in the cell according to the signal while the intensity of the received signal of the light is reduced gradually.

13 Claims, 3 Drawing Sheets

(56) References Cited

U.S. PATENT DOCUMENTS

| | | | | |
|---|---|---|---|---|
| 2018/0081061 | A1* | 3/2018 | Mandai | G01S 7/4868 |
| 2019/0120942 | A1* | 4/2019 | Zhang | G01S 7/484 |
| 2020/0207358 | A1* | 7/2020 | Katz | G06V 20/56 |
| 2021/0088663 | A1* | 3/2021 | Rinnai | G01S 17/42 |
| 2021/0396857 | A1* | 12/2021 | Fu | G01S 7/4865 |

* cited by examiner

LiDAR SENSOR FOR MEASURING NEAR-REFLECTIVITY, OPERATING METHOD THEREOF, AND VEHICLE INCLUDING LiDAR SENSOR

GOVERNMENT SUPPORT

This application was supported by Ministry of Trade, Industry and Energy of Republic of Korea (Nos. 20014592 and 1415175185).

CROSS-REFERENCE TO RELATED APPLICATION

This application claims priority to and the benefit of Korean Patent Application No. 10-2021-0145649, filed on Oct. 28, 2021, the disclosure of which is incorporated herein by reference in its entirety.

BACKGROUND

1. Field of the Invention

The present disclosure relates to light wave detection and ranging (LiDAR) technology, and more particularly, to vehicle LiDAR technology for identifying near-reflectivity using a long-distance LiDAR sensor.

2. Discussion of Related Art

In recent years, as vehicles are becoming intelligent, autonomous vehicles, advanced driver assistance systems (ADASs), and the like are being actively studied.

FIG. 1 illustrates examples of detection ranges of various types of sensors applied to a vehicle.

Various types of sensors are necessarily required to implement an autonomous vehicle, an ADAS or the like. Examples of such a sensor include a radar, a light wave detection and ranging (LiDAR) sensor, a camera, an ultrasound sensor, etc., as shown in FIG. 1. In particular, a LiDAR sensor is used by being mounted on front or rear sides of most autonomous vehicles due to an advantage of obtaining accurate distance information although the accuracy of object identification is slightly low.

A LiDAR sensor for use in a vehicle is required to have specifications capable of performing detection even at a long distance, and at the same time, a low-cost LiDAR sensor is required.

In the case of a LiDAR sensor of the related art, high-end devices such as a high-speed analog-to-converter (ADC) are used. However, when high-end devices are used, it is difficult to implement a low cost LiDAR sensor. Accordingly, an avalanche photodiode (APD) or the like based on a method of measuring an activation maintenance time of a cell included in a sensor (hereinafter referred to as a "first method") or a single photon avalanche diode (SPAD) or a silicon photomultiplier (SiPM) based on a method of measuring an activation frequency (hereinafter referred to as a "second method") may be used instead of such high-end devices.

However, in the case of a LiDAR sensor using the first or second method, high-output laser is used to measure a long distance. Accordingly, in the case of the LiDAR sensor, an activation time may be long or the same number of outputs may be received at a short distance even with respect to an object with low reflectivity and thus only a distance to the object can be identified but reflectivity cannot be measured.

However, the above description is only intended to provide background information of the present disclosure and thus should not be understood as the related art.

SUMMARY OF THE INVENTION

To address the problem of the related art as described above, the present disclosure is directed to providing a technique for identifying near-reflectivity by a long-distance light wave detection and ranging (LiDAR) sensor according to the first or second method without using high-end devices such as a high-speed analog-to-digital converter (ADC).

Aspects of the present disclosure are not limited thereto, and other aspects that are not described herein will be clearly understood by those of ordinary skill in the art to which the present disclosure pertains from the following description.

An aspect of the present disclosure provides a LiDAR sensor for detecting surroundings of a vehicle, the LiDAR sensor including a transmitter configured to generate light and transmit the light to an object, a receiver configured to receive light reflected from the object, and a signal processor configured to detect the object by processing a signal of the light received by the receiver.

The LiDAR sensor is capable of detecting an object both at a long distance and a short distance, and when the object is detected at the short distance, the transmitter may output light while gradually reducing the intensity of the light, compared to when the object is detected at the long distance, and the signal processor may determine reflectivity for a cell included in a sensor on the basis of an activation maintenance time or an activation frequency in the cell according to the signal while the intensity of the received signal of the light is reduced gradually.

The signal processor may determine the reflectivity for the cell according to the activation maintenance time using an avalanche photodiode (APD).

The signal processor may measure the activation maintenance time, which is a time period during which a threshold or more is maintained in the APD while the intensity of the signal of the received light is gradually reduced, and determine that reflectivity increases as the activation maintenance time increases.

The signal processor may measure the activation maintenance time N times (N is a natural number greater than or equal to 2) while the intensity of the signal of the received light is decreased gradually in a field-of-view (FoV) region.

The signal processor may determine the reflectivity for the cell according to the activation frequency using a single photon avalanche diode (SPAD) or a silicon photomultiplier (SiPM).

The signal processor may measure the activation frequency, which is the number of times that a threshold or more is maintained in the SPAD or the SiPM while the intensity of the signal of the received light is reduced gradually, and determine that reflectivity increases as the activation frequency increases.

The signal processor may measure the activation frequency N times while the intensity of the signal of the received light is reduced gradually in a FoV region and determine reflectivity according to MN (N is a natural number greater than or equal to 2 and M is the number of times corresponding to the activation frequency among N times).

The transmitter may first output light of maximum intensity X times among N times and gradually reduce the intensity of the light (N-X) times (X is a natural number less than N).

An aspect of the present disclosure provides an operating method of a LiDAR sensor capable of detecting an object both at a long distance and a short distance, the method including generating light and transmitting the light to an object, receiving light reflected from the object, and detecting the object by processing a signal of the received light, wherein, when the object is detected at the short distance, the transmitting of the light includes transmitting the light while gradually reducing an intensity of the light, compared to when the object is detected at the long distance, and the detecting of the object includes determining reflectivity for a cell included in a sensor on the basis of an activation maintenance time or an activation frequency according to the signal of the received light, the intensity of which is reduced gradually.

The detecting of the object may include determining the reflectivity for the cell according to the activation maintenance time using an APD.

The detecting of the object may include measuring the activation maintenance time, which is a time period during which a threshold or more is maintained in the APD while the intensity of the signal of the received light is reduced gradually, and determining that reflectivity increases as the activation maintenance time increases.

The detecting of the object may include measuring the activation maintenance time N times while the intensity of the signal of the received light is reduced gradually in a FoV region (N is a natural number greater than or equal to 2).

The detecting of the object may include determining reflectivity for the cell according to the activation frequency using a SPAD or a SiPM.

The detecting of the object may include measuring the activation frequency, which is the number of times that a threshold or more is maintained in the SPAD or the SiPM while the intensity of the signal of the received light is reduced gradually, and determining that reflectivity increases as the activation frequency increases.

The detecting of the object may include measuring the activation frequency N times while the intensity of the signal of the received light is reduced gradually in a FoV region and determining reflectivity according to M/N (N is a natural number greater than or equal to 2, and M is the number of times corresponding to the activation frequency among N times).

The transmitting of the light may include first outputting light of maximum intensity X times among N times and gradually reducing the intensity of the light (N-X) times (X is a natural number less than N).

An aspect of the present disclosure provides a vehicle including a LiDAR sensor capable of detecting the surroundings of a vehicle and capable of detecting an object both at a long distance and a short distance, wherein the LiDAR sensor includes a transmitter configured to generate light and transmit the light to an object, a receiver configured to receive light reflected from the object, and a signal processor configured to detect the object by processing a signal of the light received by the receiver.

When the object is detected at the short distance, the transmitter outputs light while gradually reducing the intensity of the light, compared to when the object is detected at the long distance, and the signal processor determines reflectivity for a cell included in a sensor on the basis of an activation maintenance time or an activation frequency in the cell according to the signal of the received light while the intensity of the received light is reduced gradually.

The LiDAR sensor may be capable of detecting an object located in a front-rear direction or a lateral direction of the vehicle.

The vehicle may be an autonomous vehicle or include an advanced driver assistance system (ADAS).

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
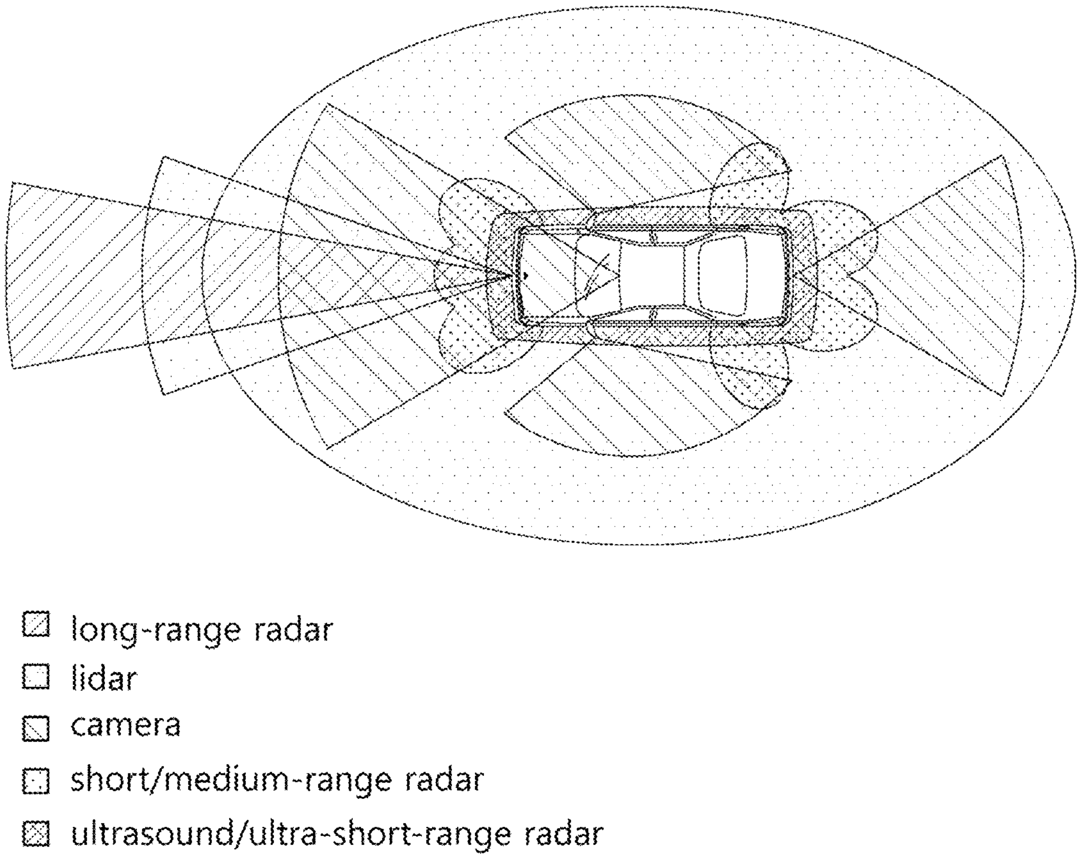
FIG. 1 illustrates examples of detection ranges of various types of sensors applied to a vehicle.

The above-described object, means, and effects of the present disclosure will be more apparent from the following detailed description in conjunction with the accompanying drawings and thus the technical idea of the present disclosure may be easily implemented by those of ordinary knowledge in the technical field to which the present disclosure pertains. The related art related to the present disclosure is not described in detail herein when it is determined that the description thereof would obscure the subject matter of the present disclosure.

The terminology used herein is for the purpose of describing embodiments only and is not intended to be limiting of the present disclosure. As used herein, singular forms are intended to include plural forms unless the context clearly indicates otherwise. It will be understood that terms such as "comprise," "include," "provided with," or "have," when used herein, do not exclude the presence or addition of one or more components other than components described herein.

In the present specification, terms such as "or" and "at least one" may refer to one of terms listed together or a combination of two or more of them. For example, expressions "A or B" and "at least one of A and B" may refer to only A, only B, or both A and B.

In the present specification, various embodiments of the present disclosure should not be understood as being limited by the possibility of inaccurate information provided with quoted features, variables, or values in a description using "for example," an allowable error, a measurement error, a limitation in the accuracy of measurement, and an effect of modification due to generally known other causes.

In the present specification, when a component is referred to as being "coupled" or "connected" to another component, it should be understood that the component may be directly coupled or connected to the other component, but another component may be interposed therebetween. In contrast, when a component is referred to as being "directly coupled" or "directly connected" to another component, it should be understood that no component is interposed therebetween.

In the present specification, it should be understood that when a component is described as being "on" or "in contact with" another component, the component may be in direct contact with or be directly connected to the other component but another component may be interposed therebetween. In contrast, it will be understood that, when a component is described as being "directly on" or "in direct contact with" another component, no component is interposed therebetween. Other expressions used to describe a relationship between components, e.g., "between" and "directly between" may be interpreted similarly.

Terms such as "first," "second," and the like may be used herein to describe various components but the components should not be limited by the terms. These terms should not be interpreted as limiting the order of components and may be used to distinguish one component from another component. For example, a "first component" may be named "second component," and similarly, a "second component" may be named "first component."

Unless otherwise defined, all terms used herein have the same meaning as commonly understood by one of ordinary skill in the art to the present disclosure pertains. Terms, such as those defined in commonly used dictionaries, will not be interpreted in an idealized or overly formal sense unless expressly so defined herein.

Hereinafter, embodiments of the present disclosure will be described in detail with reference to the accompanying drawings.

Figure 2:
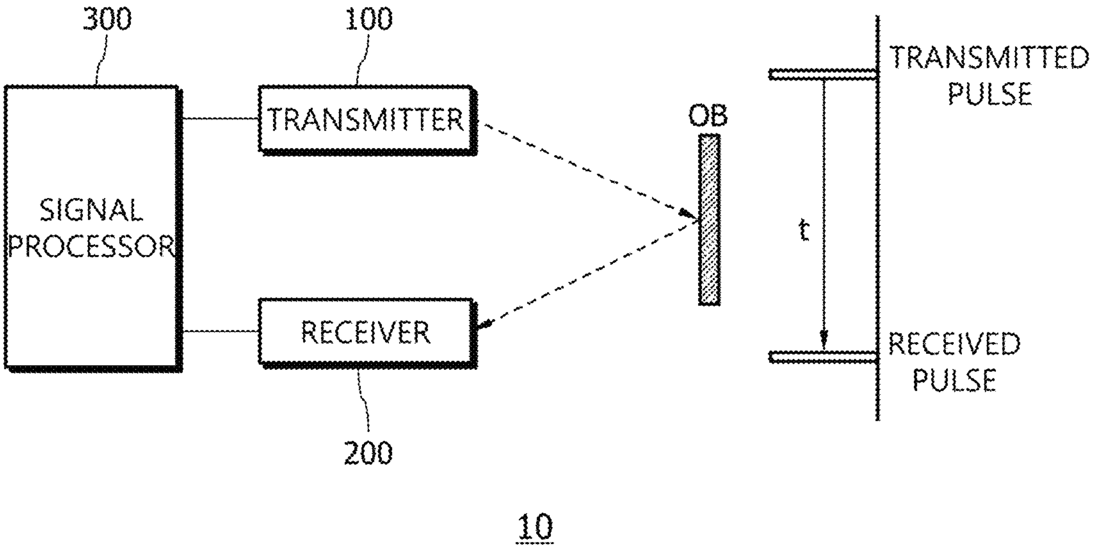
FIG. 2 is a configuration diagram of a light wave detection and ranging (LiDAR) sensor according to an embodiment of the present disclosure.

FIG. 2 is a configuration diagram of a light wave detection and ranging (LiDAR) sensor 10 according to an embodiment of the present disclosure.

The LiDAR sensor 10 according to the embodiment of the present disclosure is a sensor device that detects an object outside a vehicle and is capable of generating information about an object OB outside a vehicle using laser light. For example, the LiDAR sensor 10 may be implemented as a driven type or a non-driven type. When the LiDAR sensor 10 is the driven type, the LiDAR sensor 10 may be rotated by a motor and is capable of detecting the object OB around a vehicle. When the LiDAR sensor 10 is the non-driven type, the object OB located in a certain range from a vehicle may be detected by optical steering, and in this case, the vehicle may include a plurality of non-driven type LiDAR sensors.

In addition, a LiDAR sensor according to an embodiment of the present disclosure is capable of detecting an object OB through laser light on the basis of a time-of-flight (ToF) method or a phase-shift method, and detecting a position of the detected object OB, a distance to the detected object OB, a relative speed, etc. For example, the LiDAR sensor 10 may use a frequency modulation continuous wave (FMCW) type optical signal.

In addition, a LiDAR sensor according to an embodiment of the present disclosure may be disposed at an appropriate location on a vehicle to detect the object OB located in a front-rear direction or a lateral direction of the vehicle. For example, the LiDAR sensor 10 may be mounted on a front bumper, a radiator grill, a hood, a roof, a windshield, a door, a side mirror, a tailgate, a trunk lid, a rear bumper, a fender, or the like, but embodiments are not limited thereto.

In this case, the vehicle may be an autonomous vehicle or equipped with an advanced driver assistance system (ADAS) or the like, and may perform autonomous driving or driver assistance using information detected through the LiDAR sensor according to the embodiment of the present disclosure.

Here, the ADAS may be understood to include various types of ADASs. Examples of the ADAS may include an autonomous emergency braking system, a smart parking assistance system (SPAS), a blind spot detection (BSD) system, an adaptive cruise control (ACC) system, a lane departure warning system (LDWS), a lane keeping assist system (LKAS), a lane change assist system (LCAS), etc. However, embodiments are not limited thereto.

Specifically, the LiDAR sensor 10 may include a transmitter 100, a receiver 200, and a signal processor 300 as shown in FIG. 2. In particular, the LiDAR sensor 10 is capable of detecting the object OB regardless of whether a detection area is a long distance area or short distance area. That is, the LiDAR sensor 10 in capable detecting the object OB when the sensing area is a long distance area or short distance area.

Figure 3:
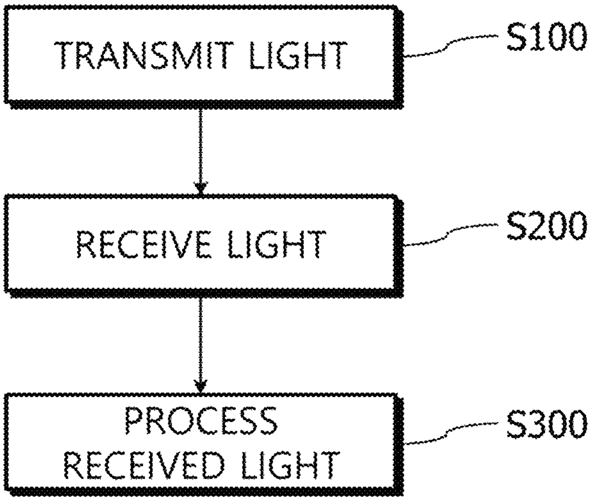
FIG. 3 is a flowchart of an operating method of a LiDAR sensor according to an embodiment of the present disclosure.

FIG. 3 is a flowchart of an operating method according to an embodiment of the present disclosure.

Referring to FIG. 3, the operating method according to the embodiment of the present disclosure is an operating method of the LiDAR sensor 10 described above, and includes operations S100 to S300 performed by the transmitter 100, the receiver 200, and the signal processor 300. Operations S100 to S300 may be performed sequentially but the present disclosure is not limited thereto. That is, operations S100 to S300 may be performed in reverse order of the order shown in FIG. 3 or at least two of operations S100 to S300 may be performed at the same time.

First, in operation S100, the transmitter 100 generates laser light and transmits the laser light to an object OB. That is, the transmitter 100 is configured to generate laser light such as a frequency-modulated continuous wave (FMCW) and transmit the laser light to an object. In this case, the transmitter 100 may include a light source for generating laser light and an optical system for controlling a path of laser light incident from the light source. For example, the optical system may include various types of lenses, mirrors, scanners, or the like but is not limited thereto.

The light source may generate laser light of the same wavelength or different wavelengths. For example, the light source may generate laser light of a specific wavelength in a wavelength region of 250 nm to 11 μm or wavelength-variable laser light, and may be implemented through a small-sized and low-power semiconductor laser diode but is limited thereto.

In particular, the light source may adjust the intensity of laser light according to a detection area, and output the adjusted laser light. For example, when the detection area is a long-distance area, the light source may output laser light of higher intensity or laser light of maximum intensity when necessary. When the detection area is a short-distance area, the light source may output laser light of lower intensity, and particularly, laser light, the intensity of which is reduced gradually by an operating method described below.

In operation S200, the receiver 200 receives light reflected from the object OB. That is, the receiver 200 is configured to receive light reflected from the object OB. For example, the receiver 200 may convert the light reflected from the object OB into an electrical signal (current or the like) using a photoelectric conversion element such as a photodiode. In this case, an angle of reception (or measurement) of the receiver 200 may be referred to as a field of view (FOV). The receiver 200 may further include an optical system for controlling a path of received reflected light. For example, the optical system may include various types of lenses, mirrors, scanners, or the like but is not limited thereto.

In operation S300, signals of light from the transmitter 100 and the receiver 200 are processed. That is, the signal processor 300 may include a processor and a memory. In this case, the processor may be electrically connected to the transmitter 100 and the receiver 200 to process a received signal and generate data about the object OB on the basis of the processed signal. The memory may store a program and various types of data for operating the processor, and store a program related to an operating method described below.

The signal processor 300 may calculate a distance to the object OB by collecting and processing data according to corresponding light. That is, the signal processor 300 may detect a distance to the object OB, a shape of the object OB, and the like by signal-processing data, which is obtained through conversion, using the ToF method, the phase-shift method or the like.

In this case, the ToF method is a method of measuring a distance to the object OB by measuring the time taken for a pulse signal reflected from the object OB, which is within a detection range, to reach the receiver 200 after emission of a laser pulse signal from the transmitter 100. The phase-shift method is a method of calculating a time taken for a signal reflected from the object OB, which is within a detection range, to reach the receiver 200 and a distance to the object OB by measuring an amount of phase shift of the reflected signal after emission of continuously modulated laser beams of a specific frequency from the transmitter 100.

The signal processor 300 may calculate reflectivity when a detection area is a short-distance area, as well as detecting information about the object OB, e.g., a distance to the object OB, using a processed signal when the detection area is a long-distance area or a short-distance area.

In the related art, high-end devices such as a high-speed ADC are used. That is, a signal processor may convert an output detected by a receiver into a voltage, amplify the voltage, and convert the amplified voltage into a digital signal using the ADC. However, the ADC is expensive and thus a low-cost LiDAR sensor is impossible to be implemented in the related art using the ADC.

Accordingly, in the present disclosure, high-end devices such as a high-speed ADC are not used, and either a method of measuring an activation maintenance time in a cell included in a sensor on the basis of a device such as an avalanche photodiode (APD) (hereinafter referred to as a "first method") or a method of measuring the activation frequency on the basis of a device such as a single photon avalanche diode (SPAD) or a silicon photomultiplier (SiPM) in a cell included in a sensor (hereinafter referred to as a "second method") is used to implement a low-cost LiDAR sensor. In this case, the sensor may receive and detect an optical signal from the receiver 200, and the signal detected by the sensor may be transmitted to the signal processor 300.

The operating method including operations S100 to S300 will be described in more detail with respect to a case in which detection is performed at a short distance.

That is, when detection is performed in a detection area which is a short-distance area, the transmitter 100 outputs laser light while gradually reducing the intensity of the laser light, compared to when detection is performed at a long distance. Accordingly, in operation S200, the receiver 200 receives the laser light, the intensity of which is reduced gradually in a FoV area. In operation S300, the signal processor 300 determines reflectivity for a cell included in a sensor on the basis of an activation maintenance time in the cell or the activation frequency according to a signal received by the receiver 200 while the intensity of the signal is reduced gradually.

Figure 4:
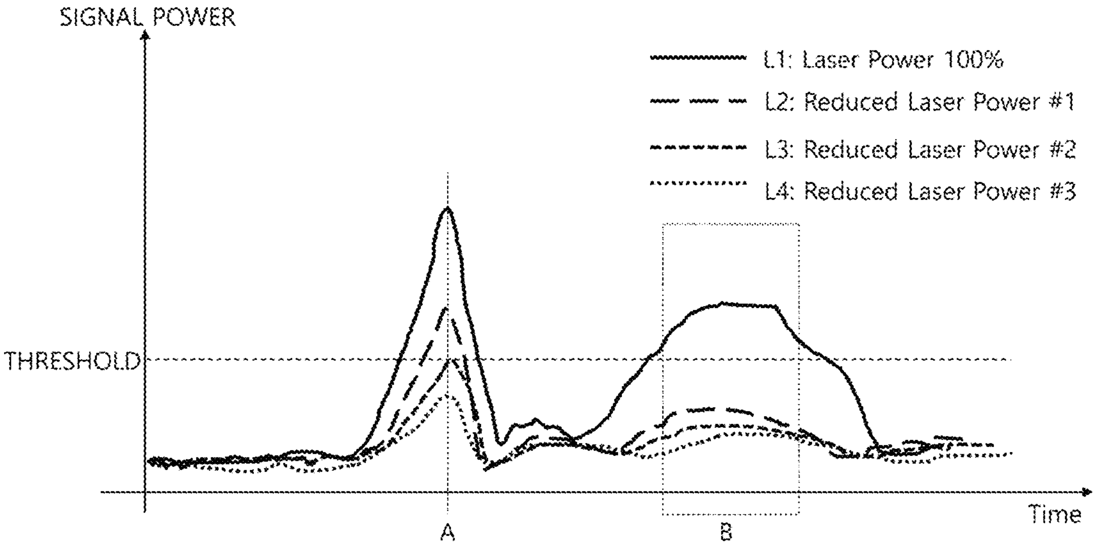
FIG. 4 illustrates an example of gradually attenuating a signal of laser light that is output to measure near-reflectivity.

FIG. 4 illustrates an example of gradually attenuating a signal of laser light that is output to measure near-reflectivity. That is, the transmitter 100 may gradually reduce an output of a signal of laser light in the order from a solid line to a short dotted line. That is, the output of the signal of the laser light is gradually reduced in the order of L1, L2, L3 and L4.

When the first method is employed by a LiDAR sensor, the signal processor 300 may determine the reflectivity for a cell according to an activation maintenance time using an APD or the like. In this case, the "activation maintenance time" is a time period during which a threshold or more is maintained in the APD or the like while the intensity of the signal of the laser light is gradually reduced.

That is, referring to FIG. 4, in a cell corresponding to a region A of the sensor, the intensity of an optical signal is greater than or equal to the threshold and thus the optical signal is detected at all of L1, L2 and L3, but in the case of L4, the intensity of an optical signal is less than the threshold and thus the optical signal is not detected. That is, an optical signal is detected in an APD of the cell in the region A while the intensity of the optical signal is reduced in the order of L1 to L3 and thus a time period from L1 to L3 is an activation maintenance time.

In cells corresponding to a region B of the sensor, the intensity of an optical signal is greater than or equal to the threshold and thus the optical signal is detected at L1, but in the case of L2, L3 and L4, the intensity of an optical signal is less than the threshold and thus the optical signal is not detected. In APDs in the cells corresponding to the region B, when an optical signal, the intensity of which is greater than or equal to the threshold, is detected only up to L12 between L1 and L2, a time period from L1 to L12 is an activation maintenance time in the case of the APDs.

That is, the signal processor 300 measures an activation maintenance time of an APD corresponding to each cell of the sensor while the intensity of an optical signal is reduced, and determines that reflectivity increases as the activation maintenance time increases. Of course, during the measurement of reflectivity, the signal processor 300 may calculate a distance to a cell and the like using a transmission or reception time of a corresponding optical signal or the like.

For example, the signal processor 300 may measure an activation maintenance time with respect to each cell N times or less (N is a natural number greater than or equal to 2 or 3) while the intensity of an optical signal received by the receiver 200 is reduced gradually in a FoV region. Thereafter, a value proportional to the activation maintenance time measured for each cell may be determined as near-reflectivity for each cell.

Next, when the second method is employed by the LiDAR sensor, the signal processor 300 may determine reflectivity for a cell according to the activation frequency using a single photon avalanche diode (SPAD), a silicon photomultiplier (SiPM) or the like. In this case, the "activation frequency" is the number of times that the threshold or more is maintained in the SPAD or the SiPM while the intensity of an optical signal is reduced gradually.

That is, referring to FIG. 4, in a cell corresponding to the region A of the sensor, an intensity of an optical signal is greater than or equal to the threshold and thus the optical signal is detected at all of L1, L2 and L3, but in the case of L4, the intensity of an optical signal is less than the threshold and thus the optical signal is not detected. That is, an optical signal is detected in an SPAD or SiPM of the cell in the region A while the intensity of the optical signal is reduced in the order of L1 to L3 and thus the number of measurements from L1 to L3, i.e., three times, is the activation frequency.

In the cells corresponding to the region B of the sensor, the intensity of an optical signal is greater than or equal to the threshold and thus the optical signal is detected at L1, but in the case of L2, L3 and L4, the intensity of an optical signal is less than the threshold and thus the optical signal is not detected. In SPADs or SiPMs in the cells corresponding to the region B, when an optical signal, the intensity of which is greater than or equal to the threshold is detected only up to L12 between L1 and L2, the number of measurements in the SPADs or SiPMs from L1 to L12 is the activation frequency.

That is, the signal processor 300 measures the activation frequency of an SPAD or SiPM corresponding to each cell of the sensor while the intensity of an optical signal is reduced, and determines that reflectivity increases as the activation frequency increases. Of course, during the measurement of reflectivity, the signal processor 300 may calculate a distance to a cell and the like using a transmission or reception time of a corresponding optical signal or the like.

For example, the signal processor 300 may measure the activation frequency N times (N is a natural number greater than or equal to 2 or 3) while the intensity of an optical signal received by the receiver 200 is reduced gradually in a FoV region. Thereafter, a value proportional to the activation frequency measured for each cell, i.e., M/N (M is the number of times corresponding to the activation frequency among N times) may be determined as near-reflectivity of the cell. In this case, in order to calculate the optimal of activation frequency, the transmitter 100 may first output light of maximum intensity (e.g., 100% intensity of laser light) X times among N times (X is a natural number less than N) and thereafter output light (N-X) times while gradually reducing the intensity of the light.

According to the present disclosure configured as described above, near-reflectivity can be measured using a long-distance LiDAR sensor without using high-end devices such as a high-speed ADC. According to the present disclosure, near-reflectivity can be measured by the first method of measuring an activation maintenance time of received light in a cell included in a sensor or the second method of measuring the activation frequency, thereby implementing a LiDAR sensor that is economical in terms of costs.

In particular, there may be a related art of measuring reflectivity on a road, in which the first or second method is used but the operating method according to the present disclosure is not used. However, in the related art, a near-distance indicator on the road cannot be accurately measured. On the other hand, according to the present disclosure, reflectivity is measured by the operating method described above using the first or second method and thus a near-distance indicator on the road can be accurately measured, thereby solving the problem of the related art.

In the present disclosure configured as described above, near-reflectivity can be measured using a long-distance LiDAR sensor without using high-end devices such as a high-speed ADC.

In addition, according to the present disclosure, near-reflectivity can be measured using either an APD based on a method of measuring an activation maintenance time of received light in a cell included in a sensor or an SPAD or SiPM based on a method of measuring an activation frequency, thereby implementing a LiDAR sensor that is economical in terms of costs.

Effects of the present disclosure are not limited thereto, and other effects that are not described herein will be clearly understood by those of ordinary skill in the art to which the present disclosure pertains from the following description.

Although embodiments of the present disclosure have been described in the detailed description of the present disclosure, various modifications may be made without departing from the scope of the present disclosure. Therefore, the scope of the present disclosure is not limited to the embodiments described herein and should be defined by the claims and their equivalents.

What is claimed is:

1. A light wave detection and ranging (LiDAR) sensor for detecting surroundings of a vehicle, the LiDAR sensor comprising:

a transmitter configured to generate a first light having a first intensity and transmit the first light to an object;

a receiver configured to receive light reflected from the object; and a signal processor configured to detect the object by processing a signal of the light received by the receiver, wherein the transmitter is further configured to output a plurality of second lights having second intensities, the second intensities being less than the first intensity and gradually reduced in sequence, wherein the signal processor is further configured to determine, for a cell, reflectivity of the object based on:

a sum of activation maintenance times corresponding to the first light and to the plurality of second lights, each activation maintenance time being a time period during which a light signal for the cell remains equal to or above a threshold, or a number of activations corresponding to the first light and to the plurality of second lights, the activation being that a light signal is equal to or above a threshold, and wherein the reflectivity is determined to be proportional to the sum of activation maintenance times or the number of activations.

2. The LiDAR sensor of claim 1, wherein the reflectivity based on the sum of activation maintenance times, and wherein the signal processor determines each activation maintenance time using an avalanche photodiode (APD).

3. The LiDAR sensor of claim 1, wherein the reflectivity based on the number of activations, and wherein the signal processor determines the number of activations using a single photon avalanche diode (SPAD) or a silicon photomultiplier (SiPM).

4. The LiDAR sensor of claim 3, wherein the signal processor measures the activations N times while receiving reflected light corresponding to the first light and the plurality of the second lights and determines the reflectivity to be proportional to M/N, wherein N is a natural number greater than or equal to 2, and M is the number of activations.

5. The LiDAR sensor of claim 4, wherein the transmitter is further configured to generate and output the first light X times and to output the plurality of the second light (N-X) times, wherein X is a natural number less than N.

6. An operating method of a light wave detection and ranging (LiDAR) sensor, which is configured to detect surroundings of a vehicle and capable of detecting an object both at a long distance and a short distance, the operating method comprising:

generating a first light having a first intensity and transmitting the first light to an object;

receiving light reflected from the object; and detecting the object by processing a signal of the received light, wherein the method further comprises:

outputting a plurality of second lights having second intensities, the second intensities being less than the first intensity and gradually reduced in sequence; and determining, for a cell, reflectivity of the object based on:

a sum of activation maintenance times corresponding to the first light and to the plurality of second lights, each activation maintenance time being a time period during which a light signal for the cell remains equal to or above a threshold, or a number of activations corresponding to the first light and to the plurality of second lights, the activation being that a light signal is equal to or above a threshold, and wherein the reflectivity is determined to be proportional to the sum of activation maintenance times or the number of activations.

7. The operating method of claim 6, wherein the reflectivity based on the sum of activation maintenance times, and wherein each activation maintenance time is determined using an avalanche photodiode (APD).

8. The operating method of claim 6, wherein the reflectivity based on the number of activations, and wherein the number of activations is determined using a single photon avalanche diode (SPAD) or a silicon photomultiplier (SiPM).

9. The operating method of claim 8, wherein the detecting of the object comprises measuring the activations N times while receiving reflected light corresponding to the first light and the plurality of the second lights and determining the reflectivity to be proportional to M/N, wherein N is a natural number greater than or equal to 2, and M is the number activations.

10. The operating method of claim 9, wherein the first light is generated and output X times and the plurality of the second lights is output (N-X) times, wherein X is a natural number less than N.

11. A vehicle including a light wave detection and ranging (LiDAR) sensor that is configured to detect surroundings of a vehicle and detects an object both at a long distance and a short distance, wherein the LiDAR sensor comprises:

a transmitter configured to generate a first light having a first intensity and transmit the first light to an object;

a receiver configured to receive light reflected from the object; and a signal processor configured to detect the object by processing a signal of the light received by the receiver, wherein the transmitter is further configured to output a plurality of second lights having second intensities, the second intensities being less than the first intensity and gradually reduced in sequence, wherein the signal processor is further configured to determine, for a cell, reflectivity of the object based on:

a sum of activation maintenance times corresponding to the first light and to the plurality of second light, each activation maintenance time being a time period during which a light signal for the cell remains equal to or above a threshold, or a number of activations corresponding to the first light and to the plurality of second light, the activation being that a light signal is equal to or above a threshold, and wherein the reflectivity is determined to be proportional to the sum of activation maintenance times or the number of activations.

12. The vehicle of claim 11, wherein the LiDAR sensor detects an object located in a front-rear direction or a lateral direction of the vehicle.

13. The vehicle of claim 11, wherein the vehicle is an autonomous vehicle or equipped with an advanced driver assistance system (ADAS).

* * * * *